Feb. 23, 1932.       C. DEGENHART ET AL       1,846,476
AUXILIARY HANDLE FOR LEVERS OF MOTOR VEHICLES
Filed Sept. 9, 1929
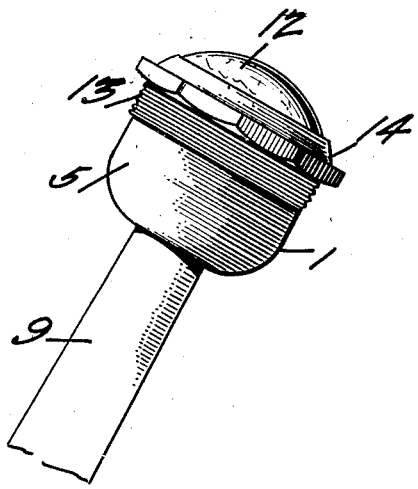
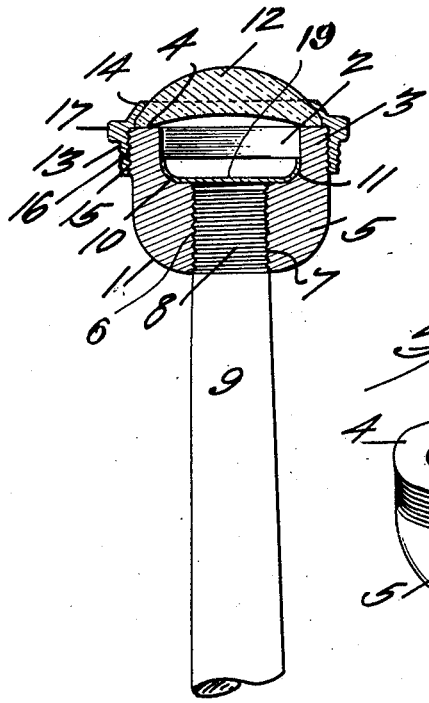
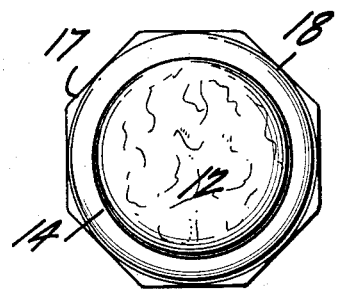
Inventors
C. DEGENHART
J. DEGENHART
By
Attorney Patented Feb. 23, 1932

1,846,476

UNITED STATES PATENT OFFICE

CHARLES DEGENHART AND JOHN DEGENHART, OF CAMBRIDGE, OHIO

AUXILIARY HANDLE FOR LEVERS OF MOTOR VEHICLES

Application filed September 9, 1929. Serial No. 391,357.

This invention is directed to an improvement in auxiliary handles for the controlling levers of motor vehicles and the like, which handles, as usually designed, are arranged for removable connections with a lever to provide a convenient hand grip and usually present more or less of an ornamental terminal for the lever.

The primary object of the present invention is the provision of an auxiliary handle or grip designed to contain any selected representation or information, with such visible at all times through the auxiliary handle under appreciable magnification, with the handle designed for convenient removal or replacement of such inserted matter.

A further object of the present invention is the provision of an auxiliary handle or grip of this character constructed to permit its convenient attachment to or removal from the hand lever, with the particular view to the convenient positioning within the auxiliary handle of the desired data or information, the latter being readily removable and replaceable within the auxiliary handle without the necessity of disconnecting the latter from the hand lever.

The invention is illustrated in the accompanying drawings, in which:

Figure 1 is a view in side elevation, showing the improved auxiliary handle or grip connected to the hand lever.

Figure 2 is a view showing the auxiliary handle in vertical section and the hand lever in broken elevation.

Figure 3 is a plan view of the auxiliary handle or grip.

Figure 4 is a perspective view of the body portion of the auxiliary handle or grip.

The improved auxiliary handle or grip includes a body 1 which is preferably of approximately semi-spherical outline, though it will be appreciated that the external shape of the handle or grip is not of particular importance and various shapes and configurations are contemplated as within the spirit of the present invention.

The upper portion of the body is substantially hollow at 2, leaving a marginal edge wall 3, the upper edge of which presents a substantially flat margin 4 of appreciable width and forming the upper edge of the body. Below the hollow portion 2, the body may be substantially solid, as at 5, except for an axial opening 6 internally threaded at 7 to receive the upper threaded end 8 of the hand lever 9 to which the body is to be removably connected.

The bottom of the hollow portion 2 of the body forms what may be termed a table 10, the larger portion of the surface of which is substantially at right angle to the axis of the body, the peripheral edges of the table merging into the side wall on a curve, as indicated at 11.

The upper open end of the body, that is the hollow portion 2, is designed to be closed by a transparent closure 12, here shown as of glass and constructed for appreciable magnification, as in the usual lens construction. This lens 12 rests squarely on the flat margin 4 of the side wall, the diameter of the closure being substantially equal to the external diameter of the body in the plane of the flat margin 4.

A retaining ring 13 is provided to removably secure the lens in place, this ring comprising a narrow flange 14 which overlies and accurately cooperates with the upper surface of the lens immediately adjacent its lower edge, such ring including a depending portion 15 having threaded cooperation at 16 with the exterior surface of the body immediately below the flat margin 4.

If desired and as preferred, the retaining ring may have a gripping margin 17 formed by slightly thickening the ring immediately adjacent the flat margin 4 and forming the thickened portion to present angularly related edges 18 for convenience in removing and applying the retaining ring.

The thickened portion of the retaining ring and the edges presented in the formation of such thickened portion are to be carefully rounded in order to present a smooth more or less rounded surface to avoid injury or discomfort to the hand when operating the lever by means of the auxiliary handle or grip.

The table 10 is arranged to receive a strip 19 of more or less flexible material, as for example paper, on which any desired representation may be imprinted or otherwise arranged. For example, the strip 19 may be a photograph of an individual or other representation, or may be a printed strip showing the insignia of a lodge or order, or may be printed with the license number of the automobile or of the driver's permit, or any other desired information.

The face of the strip that is visible through the lens may contain any pictorial representation or data and the back of the strip may, if desired, be printed with any information which it is desired to ordinarily conceal and yet have at the will of the driver by simply removing the strip from the body. Thus, the strip may bear on its face a photograph or pictorial representation or lodge insignia and the concealed surface of the strip when in position in the body may have a private mark or information by which the particular car may be identified if such becomes necessary.

It is, of course, understood that the strip or section 19 is designed more or less with a view to giving the auxiliary handle or grip an ornamental appearance, for where such strip or section bears a photograph, lodge insignia or the like, such is at all times visible through the lens 12 and appreciably magnified, so that the auxiliary handle is in this particular and as viewed from a person occupying a seat in the automobile, of a decidedly unique and ornamental appearance.

With the strip or section 19 as contemplated of sufficient area to cover the table and also the rounded marginal surface of the table, merging into the side walls, the section when viewed through the lens presents a concave appearance opposing that of the lens, so that all portions of the section or strip 19 are within the focal plane of the lens and hence there is no distortion of the image or picture and the effect is very much more pleasing than if the strip were entirely flat.

It is further noted that the strip or section 19 covers the upper end of the axial opening 7 in which the threaded end of the lever 9 is secured. Thus, the juncture of the body and lever is entirely concealed by the strip when viewed through the lens.

As previously stated, the external shape of the body is of no particular importance, though it is preferred that the external portion below the table be more or less rounded to avoid disagreeable obstruction to the hand in operating the lever by means of the auxiliary handle.

It is of course to be understood that the body may and preferably is constructed of metal, though it will be evident that many materials other than metal are readily adaptable to this use, and in this connection it is to be understood that the invention contemplates the construction of the body of any appropriate material having sufficient hardness and rigidity to provide for its connection to and its use as a handle or grip for a hand lever. Thus, hard rubber, glass, "bakelite", and a number of materials in addition to metal may be satisfactorily employed.

What is claimed to be new is:

An ornamental auxiliary handle for hand levers including a body formed with an axially arranged threaded opening leading through the bottom of the body, the upper portion of the body above the opening being recessed as a continuation of the opening, with the recess of less depth than the similar dimension of the opening and of materially greater diameter than the opening, the side wall of the body extending substantially parallel to the axis of the body to a point adjacent the bottom of the body, to thereby provide a wall surrounding the threaded opening in the body of material thickness and providing a handle portion of a substantially uniform diameter throughout its length and materially greater than that of the lever with which it cooperates to afford a hand grip, a removable closure for the upper end of the body, said closure overlying the recess and being of transparent material having a magnifying effect, and an element cooperating with the exterior of the body and overlying and securing the closure in place.

In testimony whereof we affix our signatures.

CHARLES DEGENHART. [L. S.]
JOHN DEGENHART. [L. S.]